United States Patent [19]
Borom et al.

[11] Patent Number: 5,897,921
[45] Date of Patent: Apr. 27, 1999

[54] DIRECTIONALLY SOLIDIFIED THERMAL BARRIER COATING

[75] Inventors: Marcus Preston Borom, Schenectady; Dennis Michael Gray, Delanson; Curtis Alan Johnson, Schenectady, all of N.Y.

[73] Assignee: General Electric Company, Schenectady, N.Y.

[21] Appl. No.: 08/788,010

[22] Filed: Jan. 24, 1997

[51] Int. Cl.[6] .................................. C23C 4/02; C23C 4/10
[52] U.S. Cl. ........................................ 427/454; 427/446
[58] Field of Search .................................. 427/446, 453, 427/454, 535, 539

[56] References Cited

U.S. PATENT DOCUMENTS

| | | | |
|---|---|---|---|
| 5,073,433 | 12/1991 | Taylor | 428/134 |
| 5,688,564 | 11/1997 | Coddet et al. | 427/454 |
| 5,705,231 | 1/1998 | Nissley et al. | 427/453 |

OTHER PUBLICATIONS

"Development of Improved–Durability Plasma Sprayed Ceramic Coatings for Gas Turbine Engines", by I.E. Sumner, NASA Lewis Research Center, Cleveland, Ohio; and D. Ruckle, Pratt & Whitney Aircraft, East Hartford, Conn. Jun. 30–Jul. 2, 1980, pp. 4–13.

"Experimental and Theoretical Aspects of Thick Thermal Barrier Coatings for Turbine Applications" by G.Johner, V. Wilms, Hanau, West Germany and K.K. Schweitzer, P. Adam, Motoren–Und Turbinenion Munchen, Munchen West Germany, pp. 155–165 (no date).

*Primary Examiner*—Katherine A. Bareford
*Attorney, Agent, or Firm*—Noreen C. Johnson; Douglas E. Stoner

[57] ABSTRACT

A method and apparatus form a thermal barrier coating on a metal component. A molten thermal barrier coating powder is sprayed on the component in sweeping strokes. A plurality of overlapping solidified coating ribbons are deposited on the component and include a sequentially deposited surface ribbon forming sublayer ribbons therebelow. The surface ribbon is preheated at a spray site so that the sprayed molten powder remelts the surface ribbon at the spray site for sequentially welding the sequentially deposited surface ribbons to the sublayer ribbons.

7 Claims, 4 Drawing Sheets

DIRECTIONALLY SOLIDIFIED THERMAL BARRIER COATING

FIELD OF THE INVENTION

The present invention relates generally to thermal barrier coatings, and, more specifically, to a method and apparatus for depositing an improved thermal barrier coating atop a metal workpiece or component.

BACKGROUND OF THE INVENTION

In a gas turbine engine, compressed air is mixed with fuel in a combustor and ignited for generating hot combustion gases which flow downstream through one or more stages of turbine vanes and blades from which energy is extracted for producing output power. The vanes, blades, and flowpath bounding the combustion gases are therefore subject to substantial heat load, and are therefore typically cooled for obtaining a suitable useful life thereof.

In order to protect hot flowpath components such as vanes, blades, and turbine shrouds, they may be coated with a thermal barrier coating (TBC), such as ceramic zirconia for example, which provides an effective thermally insulating barrier between the base metal of the components and the hot combustion gases.

Thermal barrier coatings are typically applied to the base metal of the various components by spraying the TBC in powder form, melting the powder, and coating the component with the molten powder is a series of overlapping layers which solidify on contact with the component to produce a solidified thermal barrier coating of appropriate thickness.

A typical process uses a conventional plasma torch which produces a hot ionized plasma for melting the TBC powder injected therein which is then sprayed atop a conventional bondcoat on the workpiece. A typical TBC is yttria stabilized zirconia which has a melting temperature of about 2,700° C. The plasma torch and workpiece are typically moved relative to each other so that the coating may be applied in layers over the entire surface of the workpiece. A suitable number of layers normal to the surface are deposited for achieving a desired thickness of the coating.

One problem experienced with jet engine components which are plasma spray coated with TBC is the high susceptibility of edge delamination of the TBC during grinding in the manufacturing process. And, TBC coated components are also subject to undesirable thermal shock damage in the gas turbine engine. Spallation is a condition wherein the TBC delaminates over time decreasing the effective useful life of the coated component.

These problems are attributed to the typical process of air plasma spraying the TBC during manufacture which requires that overlapping layers of the deposited coating meet the required thickness levels thereof. As coating thickness is increased, delamination problems correspondingly increase. Accordingly, it is desired to provide an improved method and apparatus for depositing TBC atop metal components for improving the useful life thereof, and alleviating these problems.

SUMMARY OF THE INVENTION

A method and apparatus form a thermal barrier coating on a metal component. A molten thermal barrier coating powder is sprayed on the component in sweeping strokes by moving a plasma gun over the component. A plurality of overlapping solidified coating ribbons are deposited on the component and include a sequentially deposited surface ribbon forming sublayer ribbons therebelow. The surface ribbon is preheated at a spray site so that the sprayed molten powder remelts the surface ribbon at the spray site for sequentially welding the sequentially deposited surface ribbons to the sublayer ribbons.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
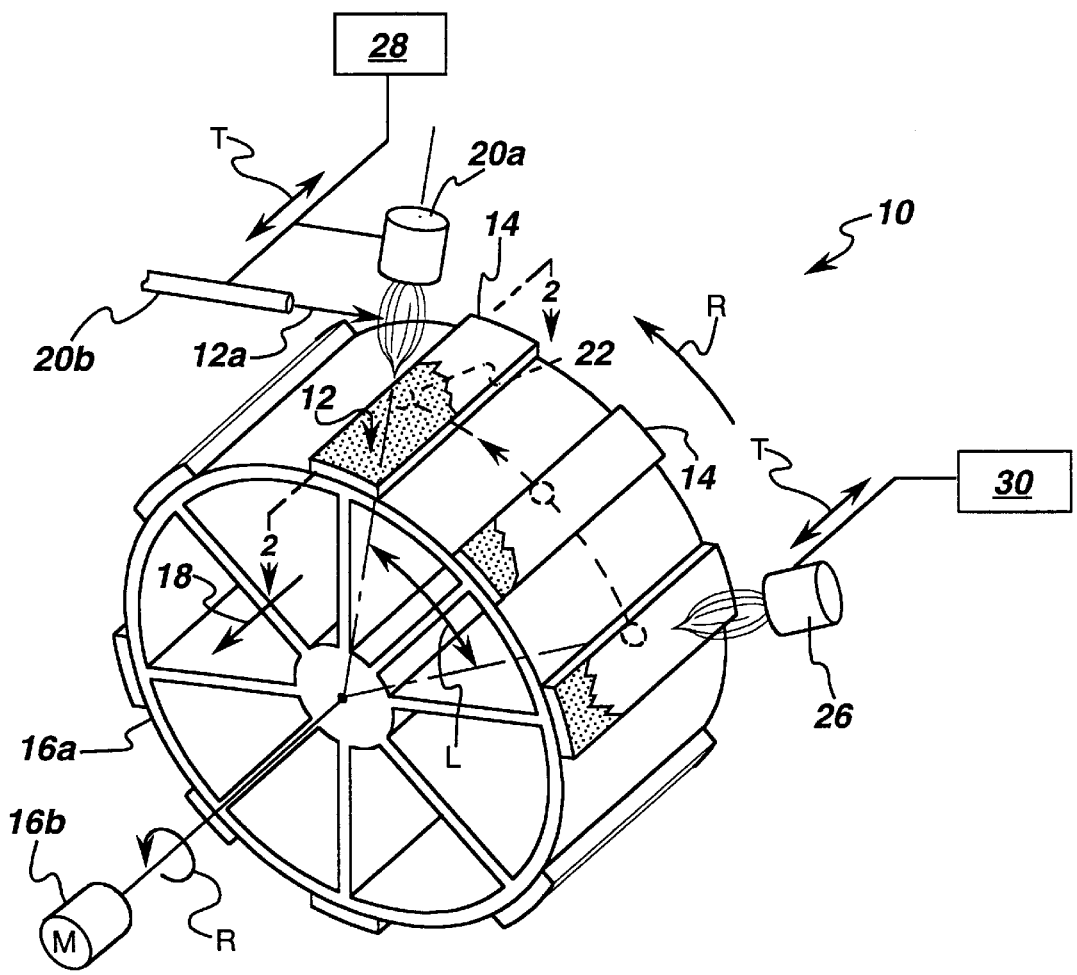
FIG. 1 is a schematic representation of an apparatus for depositing a thermal barrier coating atop metal components in accordance with an exemplary embodiment of the present invention, including a plasma torch and a preceding preheater.

Illustrated schematically in FIG. 1 is an apparatus 10 for practicing a method of forming a thermal barrier coating (TBC) 12 on a metal workpiece or component 14. Means are provided for rotating the component 14 over a plurality of revolutions, and in an exemplary configuration include a hollow drum 16a having a plurality of the components 14 circumferentially spaced apart around the perimeter thereof and suitably joined thereto. The drum 16a may take any suitable form preferably being hollow for circulating ambient, low temperature air 18 therethrough between a plurality of radial spokes joined at a center hub.

The component rotating means further include a suitable motor 16b operatively joined to the hub of the drum 16a for rotating the drum 16a in the exemplary counterclockwise rotating direction R illustrated in FIG. 1. In this way, rotation of the drum 16a rotates the several components 14 thereon along a common annular path for sequentially thermal barrier coating the several components 14 in turn.

Figure 2:
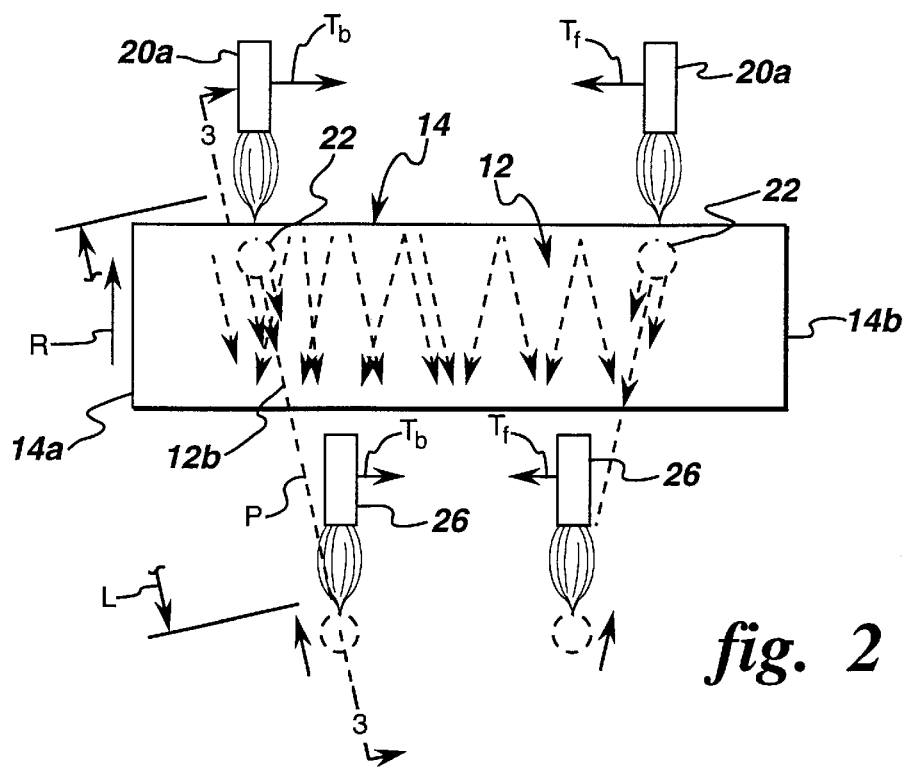
FIG. 2 is a top view of an exemplary component being rotated in the apparatus of FIG. 1, and taken generally along line 2—2, illustrating relative position of the plasma torch and preheater during traverse across the component in two opposite directions.
Figure 3:
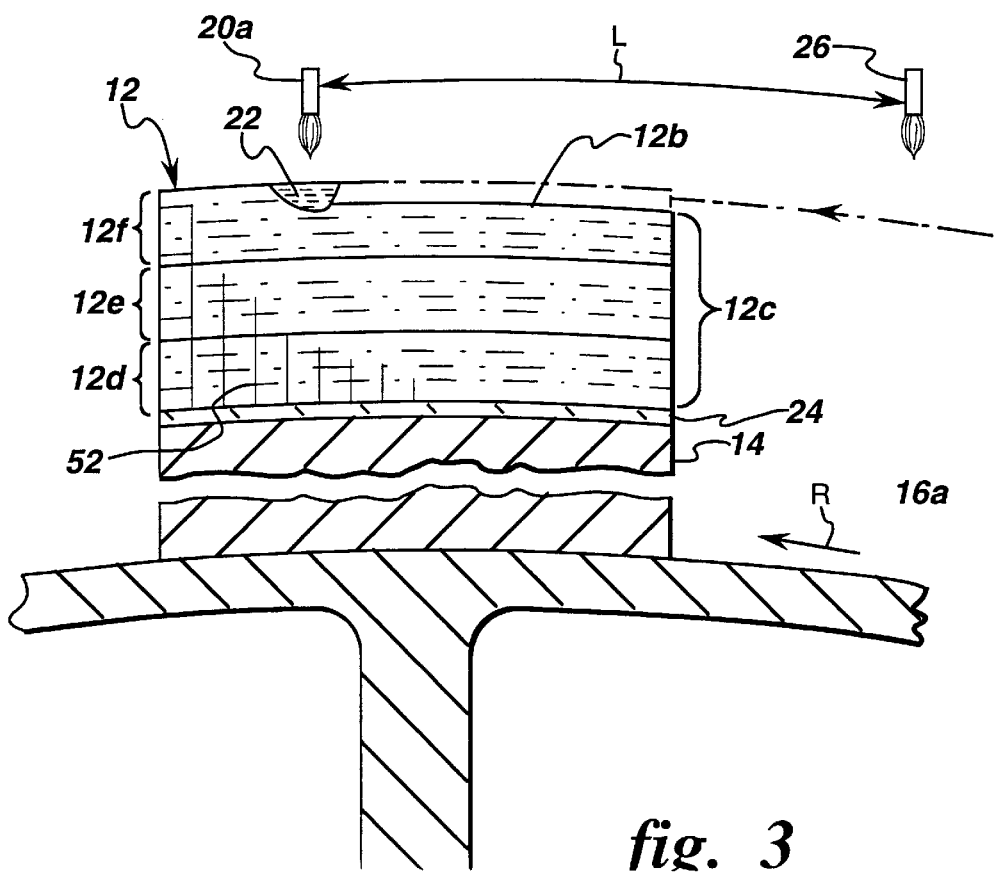
FIG. 3 is an elevational, sectional view through the exemplary component illustrated in FIG. 2, and taken along line 3—3, showing in exaggerated form the deposit of a plurality of coating sublayers arranged in a plurality of pass layers atop the metal component.

Additional means 20a,b are provided for spraying a suitable thermal barrier coating initially in the form of a powder 12a suitably heated to a molten state and deposited at a spray site 22 on the rotating component 14 to deposit or coat thereon a plurality of overlapping solidified coating ribbons 12b,c as illustrated in more particularity in FIGS. 2 and 3. In the exemplary embodiment illustrated in FIGS. 1–3, the coating powder 12a may take any suitable form for providing a good thermal insulator atop the component 14. For example, the powder 12a may be a suitable ceramic material such as yttria stabilized zirconia which has a melting point of about 2,700° C. And, the spraying means may take any suitable form for injecting and melting the powder for deposition atop the rotating components 14.

In the exemplary embodiment illustrated, the spraying means include a conventional air plasma spray torch 20a suitably supplied with an ionizing gas, such as hydrogen, for effecting a high temperature ionized plasma for melting the powder 12a. A suitable powder injector 20b is disposed adjacent to the plasma torch 20a for injecting the powder 12a from a suitable powder supply using a carrier gas for transport into the ionized plasma discharged from the plasma torch 20a. The plasma melts the powder 12a in flight for spray coating the molten powder 12a in particle form at the spray site 22 over which the component 14 is rotated during operation.

As the drum 16a rotates during operation, each of the components 14 illustrated in FIG. 1 is carried along the same annular path to the common spray site 22 under the plasma torch 20a for depositing the molten powder 12a as solidified ribbons 12b,c thereon, as illustrated in FIGS. 2 and 3. The component 14 may take any suitable form and material composition, and in the exemplary embodiment illustrated in FIGS. 1–3 is in the form of a conventional turbine shroud segment for a gas turbine engine. It may be formed of a suitable high temperature material such as nickel or cobalt based alloys. And, during the coating process illustrated in FIGS. 1–3, the component 14 itself is at a temperature substantially lower than the melting temperature of the coating powder 12a.

Accordingly, as the molten powder 12a is spray deposited atop the component 14, heat is immediately dissipated therefrom for solidifying the molten powder atop the component 14 as an elongate strip or ribbon 12b,c. A single ribbon is formed atop each component 14 for each revolution of the drum 16a. Subsequent revolutions of the drum 16a are then used to overlap the sequentially deposited ribbons to obtain any desirable thickness normal to the top surface of the component 14.

As shown in FIG. 3, the component 14 preferably includes a conventional bond coat 24 on the top surface thereof to which the thermal barrier coating 12 is attached. For each revolution of the drum 16a, a surface ribbon 12b is initially deposited, and then overlapped in the normal direction atop the component 14 by the next surface ribbon 12b, with the previous surface ribbon then becoming a sublayer ribbon 12c. The normal direction to the component is also the radial direction relative to the rotating drum 16a, along which the thickness of the coating 12 is built in a plurality of sublayers. The last applied ribbon is referred to as the surface ribbon 12b since it is exposed atop the previously formed sublayers 12c and next receives the deposited molten powder 12a as the component 14 rotates until the process is completed. Each former surface ribbon 12b therefore becomes a deeper and deeper sublayer 12c as more and more ribbon layers are deposited atop the preceding sublayers.

In the exemplary embodiment illustrated in FIG. 1, the coating 12 is deposited atop the several components 14 sequentially at the common, singular spray site 22, and therefore the respective coatings 12 dissipate heat over the course of each revolution of the drum 16a between deposition of the overlapping ribbons. The initial molten powder 12a splatters atop the components 14 as it is deposited and immediately solidifies due to heat loss therefrom.

Bonding between the individual deposited layers depends on the various conventional operating parameters of the plasma torch 20a and heat dissipation from the rotating components 14. The interlayer bond may have various forms and strength, such as an adhesion bond, or a diffusion bond, or a welded bond. As indicated above in the Background section, conventional air plasma sprayed thermal barrier coatings in practice experience delamination and spallation which affect manufacturing, and life thereof during operation in the gas turbine engine hot environment. Accordingly, it is desirable to ensure an improved bond between the various layers of the deposited coating 12 irrespective of heat loss during processing.

In accordance with one embodiment of the present invention as illustrated in FIG. 1, means in the form of a suitable preheater 26 are provided for preheating the surface ribbon 12b ahead of the spray site 22, as illustrated in more particularity in FIGS. 2 and 3, so that the plasma and molten powder spray from the plasma torch 20a locally remelt at least the surface of the solidified surface ribbon 12b at the spray site 22 for continuously welding the deposited molten powder 12a to the surface ribbon 12b, and in turn welding the surface ribbon 12b to the previous sublayer ribbons 12c formed in sequence.

This is illustrated schematically in FIG. 3 wherein one of the components 14 firstly passes the preheater 26 which suitably increases the temperature of the surface ribbon 12b so that when it reaches the plasma torch 20a the additional heat provided by the plasma torch 20a and sprayed molten powder 12a effect localized melting of the surface ribbon 12b so that the deposited molten powder 12a at the spray site 22 welds to the preceding surface layer 12b prior to solidifying. As the drum 16a continues to rotate, the just deposited molten powder 12a immediately solidifies due to heat dissipation therefrom and forms the next surface ribbon 12b. When one surface ribbon 12b is completely overlapped by the next deposited surface ribbon 12b, it then becomes a sublayer ribbon 12c welded along its entire extent to the preceding sublayer ribbon 12c. In this way, the resulting multilayer coating 12 is formed of welded together sublayers for providing enhanced bonding therebetween and significantly reducing the likelihood of delamination during edge grinding and subsequent manufacturing operations, or due to thermal shock in operation in the hot environment of the gas turbine engine.

Although FIGS. 1–3 illustrate the use of a conventional air plasma torch 20a for providing the required heat for melting the powder 12a, any type of heat source may be used therefore. The preheater 26 illustrated in FIGS. 1–3 may also take the form of any suitable heating device such as another conventional air plasma torch, like torch 20a, without attendant powder injection thereat. And, other types of gas torches may be used for example.

Since the typical workpiece or component 14 illustrated in FIGS. 1–3 has a relatively large surface area, the coating 12 must be applied not only along the annular rotation path, but also along the longitudinal or axial direction of the component 14 for coating the entire top surface thereof, for example. The use of several components 14 on the common rotating drum 16*a* improves the process efficiency of coating several components 14 in a common operation.

The common spraying means 20*a,b* are effective in the embodiment illustrated in FIG. 1 for sequentially plasma spraying the ribbons 12*b,c* radially or perpendicularly atop the several components 14 in turn over each revolution of the drum 16*a*. The hollow drum 16*a* ensures effective backside cooling of the components 14 from radially below into the ambient air 18 for promoting desirable solidification of the deposited coating 12 as described in more detail hereinbelow.

The spray site 22 illustrated in FIG. 1 may be suitably positioned at any axial or longitudinal position along the components 14 and traces arcuate paths along each of the components 14 in turn as they are rotated by the drum 16*a* sequentially to the spray site 22 for receiving the molten powder thereat. In order to coat the entire longitudinal extent of each of the components 14, suitable means in the form of a first carriage 28 are operatively joined to the plasma torch 20*a* and cooperating powder injector 20*b* for traversing the spray site 22 axially or longitudinally along the drum 16*a* and along the components 14 rotating thereon.

The traversing direction is indicated by the double headed arrow T and is suitably selected for traversing the entire longitudinal extent of the component 14, while conventionally maintaining a suitably fixed vertical spacing atop the respective portions of the component 14. The components 14 may be curved, like turbine shroud segments for example, and therefore, the first carriage 28 would be configured for traversing the spray site 22 normally atop the corresponding curvature of the component 14 if desired. The first carriage 28 may therefore take any conventional form and is preferably robotically controlled in a multi-degree of freedom, digitally controlled machine typically found in the turbine manufacturing industry.

As illustrated schematically in FIG. 2, the plasma torch 20*a* will initially be positioned atop one of the longitudinal opposite ends of the component 14 and then axially traversed toward the opposite end for correspondingly moving the spray site 22 to completely coat the top surface of the component 14 as the drum 16*a* rotates during the process. As shown in FIG. 2, the exemplary component 14 has a first or front axial end 14*a*, and an axially opposite second or back end 14*b*.

The first carriage 28 is effective for traversing the plasma torch 20*a* and cooperating powder injector 20*b* for correspondingly traversing the spray site 22 in a first axial pass direction $T_b$ from the forward to back ends of the component 14. The combined rotation R of the component 14 and traverse $T_b$ therefore effect relative sweeping of the spray site 22 over a plurality of coating strokes to cover the entire top surface of each component 14. In this exemplary embodiment, each coating stroke deposits a coating ribbon along a helical thread or pitch P as shown in FIG. 2 which is selected to form across the component 14 a continuous first pass layer 12*d*, as illustrated in FIG. 3, which includes a plurality of both radially and axially overlapping sublayer ribbons 12*c*. FIG. 3 illustrates in horizontal phantom lines the formation of four exemplary vertically or radially overlapping sublayers 12*c* in the first pass layer 12*d*. The pitch P illustrated in FIG. 2 is selected to ensure that the individual sublayer ribbons 12*c* deposited at the traveling spray site 22 also overlap each other laterally along the axial or longitudinal direction of the component 14 for providing a continuous coating 12 thereupon.

When the spray site 22 illustrated in FIG. 2 reaches the back end 14*b* of the component 14, the first carriage 28 reverses direction to traverse the spray site 22 in the axially opposite direction $T_f$ from the back to front ends of the component 14. In this way, a continuous second pass layer 12*e* is similarly formed, and includes a plurality of axially and radially overlapping sublayer ribbons 12*c* atop the first pass layer 12*d*. In the exemplary embodiment illustrated in FIG. 3, the second pass layer 12*e* is shown with phantom horizontal lines as including four exemplary sublayer ribbons 12*c*. The traversing process may then be repeated for forming yet another, third pass layer 12*f*, also including four exemplary sublayer ribbons 12*c* therein when complete. Of course, the number of pass layers, and the number of individual sublayers therein may be chosen as desired for each application.

However, the adverse significance of forming the coating 12 in a number of pass layers is the resulting time delay, or "torch holiday," between pass layers during which the previously deposited coating is allowed to dissipate heat and lose temperature. Since the coating powder 12*a* is initially melted by the plasma torch 20*a* to a temperature above 2,700° C., it rapidly decreases in temperature in flight and upon solidifying on the component 14. Heat is quickly dissipated from the deposited coating both by thermal conduction into the underlying component 14, and in turn into the rotating drum 16*a*, and by thermal radiation from the surface of the deposited coating 12. In conventional air plasma sprayed thermal barrier coatings, the torch holiday is a significant factor controlled by the required operating parameters of the process, which can lead to poor bonding between the several pass layers and the subsequent delamination problems during edge grinding, or spallation during prolonged operation in the gas turbine engine environment.

One solution to this problem is the use of the preheater 26 illustrated in FIGS. 1–3 which provides an additional source of heat energy into the component 14 for preheating the surface ribbon 12*b* of the first pass layer 12*d* ahead of the spray site 22 so that the spraying remelts the surface ribbon 12*b* at the spray site 22, as shown pictorially in FIG. 3, for welding the second pass layer 12*e* to the first pass layer 12*d*, as well as for so welding each subsequent pass layer such as the third pass layer 12*f* to the second pass layer 12*e*.

In the exemplary embodiment illustrated in FIGS. 1–3, the surface ribbon preheating effected by the preheater 26 is independent of heat from the plasma torch 20*a*, and applies additional heat to the surface ribbon 12*b* ahead of the spray site 22, but is coordinated with the plasma torch 20*a* so that the combined heat input at the spray site 22 is effective for locally melting the surface ribbon 12*b* at the spray site 22.

Since the preheater 26 as illustrated in FIG. 1 should be suitably coordinated with the plasma torch 20*a*, the preheating means preferably also include a second carriage 30 for traversing the preheater 26 along the components 14 or drum 16*a* in the same traverse direction T in coordination with traversing of the spray site 22. As shown in FIGS. 1–3, the preheater 26 preferably precedes the plasma torch 20*a* at the spray site 22 by a fixed lead angle L which may be less than one revolution, in the exemplary range of about 10°–350°, or may even precede the spray site 22 by greater than one revolution for suitably preheating the surface ribbon 12*b* ahead of the spray site 22 to ensure localized melting thereof upon deposition of the molten powder 12*a* thereon. As shown in FIG. 2, the sweeping spray site 22 effects the helical pitch P, and the preheater 26 therefore axially precedes traverse of the spray site 20 in the same, or slightly ahead of the, pitch line with the individual surface ribbon 12*b* over which the next surface ribbon 12*b* is deposited.

Since the thread pitch P of the deposited surface ribbons 12b reverses pitch between the alternating pass layers 12d–f, the second carriage 30 is preferably configured to shift position of the preheater 26 between the passes to correspond with the change in pitch therebetween. This is illustrated schematically in FIG. 2 wherein the plasma torch 20a and cooperating preheater 26 are illustrated in two positions traversing in opposite directions $T_b$ and $T_f$. The second carriage 30 may take any conventional form, like the first carriage 28, and is preferably robotically controlled in the form of a conventional, digitally controlled machine. For example, the preheater 26 may be attached to the first carriage 28 for coordinated movement therewith.

As indicated above, by selectively preheating the spray site 20 in coordination with the plasma torch 20a, local remelting of the surface ribbon 12b at the spray site 22 is ensured for ensuring a strong welded bond between the individual sublayers 12c, and between the pass layers 12d–f. Furthermore, by maintaining a suitable differential temperature from the top of the coating 12 downwardly toward the component 14, improved microstructure of the deposited thermal barrier coating 12 may be obtained. In the example wherein the coating 12 is formed of zirconia having a melting temperature of about 2,700° C., local melting of the surface ribbon 12b at the spray site 22 may be obtained, but the bulk temperature of the previously deposited sublayer ribbons 12c is substantially lower.

As indicated above, thermal radiation and conduction quickly remove heat from the deposited coating 12 and component 14. By mounting the components 14 atop the hollow drum 16a, a preferential temperature drop downward from the surface ribbon 12b and generally normal to the top surface of the component 14 is obtained for promoting directionally solidified (DS) columnar crystalline grain growth from the sublayer ribbons 12c into the surface ribbon 12b.

The temperature of the surface ribbon 12b at the spray site 22 partially controls the localized melting thereat, and also controls the desired temperature drop downwardly through the sublayers and into the component 14 for promoting columnar grain growth. A suitable amount of temperature drop is required to promote directional solidification, which is easily obtained by backside cooling of the component 14 from within the hollow rotating drum 16a.

Directionally solidified grain growth is a conventional process typically employed for various gas turbine engine components such as turbine vanes and blades wherein molten metal pool in a crucible is preferentially solidified or grown along a longitudinal axis typically associated with the radial axis of the vane or blade. The resulting columnar grains therein provide enhanced strength along their vertical axis.

In an analogous manner, by rapidly rotating the drum 16a, at several hundred rpm for example, the individual sublayers 12c are deposited, and directionally solidified columnar grain growth may be promoted from the bond coat 24 normally outwardly therefrom, with the local remelting at the spray site 22 allowing continuation of columnar grain growth upwardly into each successively deposited ribbon. As the coating 12 cools, desirable vertical cracking is obtained therein which retains the desirable columnar grain growth. The vertical boundary between adjacent columnar grains is illustrated schematically by the vertical boundaries 52 illustrated in part in FIG. 3 in exaggerated scale.

The scale of FIG. 3 is greatly exaggerated to represent the individual sublayer ribbons 12c, pass layers 12d–f, localized melting of the surface ribbon 12b, and the directionally solidified columar grain growth within the coating 12. In reality, all of these phenomena are visible only at the microstructure scale of the coating 12, with the coating 12 having an exemplary total thickness of about 10–15 mils, for example, but may be up to about 100 mils if desired. The total coating thickness is preferably formed of several pass layers, with each pass layer including several sublayers which may be less than about 1 mil thick each. The resulting component 14 so coated with the thermal barrier coating 12 therefore enjoys both the improved bonding strength of the sublayers, and columnar grains therein for improving resistance to edge delamination during conventional manufacturing grinding processes, as well as for improving resistance to spallation during operation of the component in the hot environment of a gas turbine engine.

Figure 4:
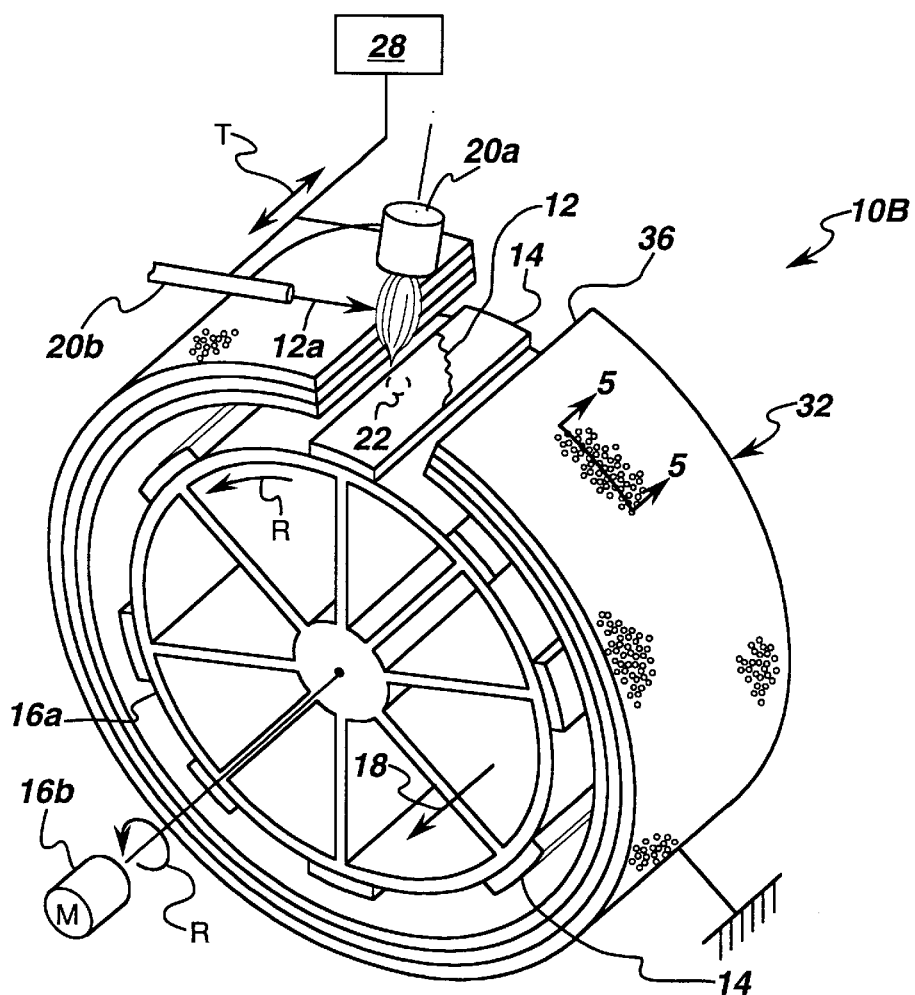
FIG. 4 is a schematic representation similar to FIG. 1 illustrating a second embodiment of the present invention, including a radiation shield surrounding the metal components for providing preheating thereof.
Figure 5:
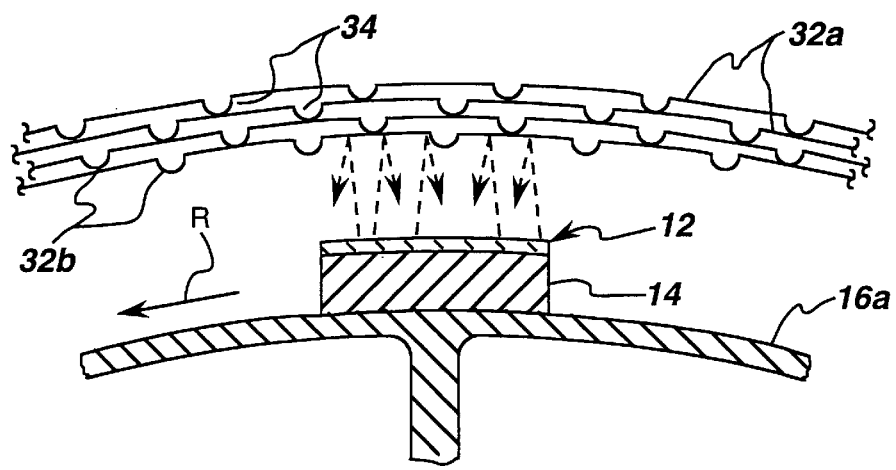
FIG. 5 is an elevational, sectional view through a portion of the radiation shield and an exemplary metal component illustrated in FIG. 4 and taken generally along the plane 5—5.

Although preheating of the surface ribbon 12b may be accomplished by using a separate preheater 26 as illustrated in the embodiment of FIGS. 1–3, preheating may be otherwise affected. For example, FIGS. 4 and 5 illustrate another embodiment of the invention having a similar apparatus designated 10b which is identical to the apparatus 10 illustrated in FIGS. 1–3 except that the ribbon preheating means is not in the form of a separate preheater 26, but instead is in the form of a thermal radiation shield 32 which is dependent on heat from the plasma torch 20a, and shields thermal radiation from the ribbons coated on the component 14 to decrease cooling thereof between the revolutions. The radiation shield 32 may be used by itself or it may be combined with the preheater 26 illustrated in FIG. 1, if desired.

The radiation shield 32 as illustrated in FIGS. 4 and 5, is suitably spaced above the rotating components 14 on the drum 16a for shielding or blocking loss of thermal radiation from the ribbons coated on the component 14 to decrease cooling thereof between revolutions. As indicated above, thermal radiation from the deposited coating 12 is a significant heat loss mechanism which rapidly cools the deposited coating 12. The radiation shield 32 may take any suitable form for effectively blocking loss of thermal radiation from the deposited coating 12 during the plasma spraying process for retaining sufficient heat therein for effecting the localized melting at the spray site 22 under the plasma torch 20a as shown in the FIG. 3 embodiment.

In the exemplary embodiment illustrated in FIGS. 4 and 5, the radiation shield is configured to reflect radiated heat back to the ribbons of the coating 12, and is preferably concave toward the component 14 to efficiently reflect the radiated heat thereto. This is illustrated schematically in FIG. 5.

The radiation shield 32 preferably includes a plurality of thin sheet metal layers 32a spaced apart to define air-entrained insulating voids 34 therebetween for reducing thermal conduction through the shield 32 itself. The voids 34 may be formed by providing a plurality of laterally spaced apart dimples or bumps 32b in the layers 32a which engage flat portions of the adjacent layers 32a for maintaining a predetermined distance therebetween. The radiation shield 32 may be formed of stainless steel, for example, having a suitably polished and reflective surface for enhancing thermal radiation reflection back to the coating 12 atop the components 14.

As illustrated in FIG. 4, the radiation shield 32 is preferably stationary, and may be formed of concentric, or spiralling layers spaced radially above the perimeter of the drum 16a to cover the entire longitudinal top surfaces of the workpieces 14 as they rotate, for providing a suitable thermal radiation shield thereabove. The shield 32 preferably includes an axial access slot 36 for receiving the molten powder 12a at the spray site 22 which is delivered by the plasma torch 20a therethrough. The access slot 36 is sufficiently long for allowing traverse of the plasma torch 20a and spray site 22 along the component 14. In this way, heat added into each component 14 by the plasma torch 20a is more fully retained from revolution to revolution by the radiation shield 32 for allowing local remelting of the surface ribbon at the spray site 22 and thereby promoting the desirable columnar grain growth within the deposited coating 12.

The exemplary apparatuses 10,10B disclosed above with respect to FIGS. 1–5 are effective for practicing an enhanced method of plasma spraying thermal barrier coating atop the rotating components 14 for promoting columnar grain growth therein, and improving the interlayer bonding therein. Depending upon the configuration of the individual workpiece or component to be thermal barrier coated, the coating apparatus may vary in configuration.

Figure 6:
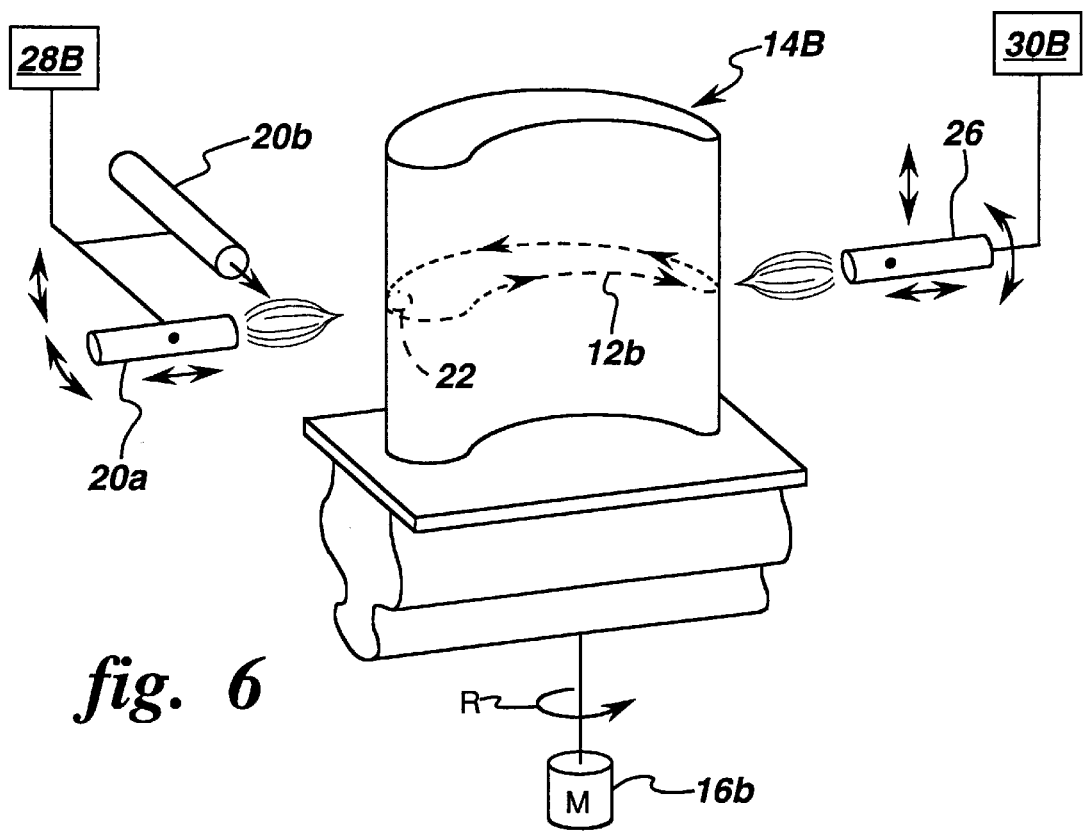
FIG. 6 is a schematic representation of another embodiment of the present invention using a plasma torch and preheater for depositing a thermal barrier coating atop a gas turbine engine rotor blade.

For example, FIG. 6 illustrates a workpiece or component in the form of an exemplary gas turbine engine turbine rotor blade 14B which is suitably joined to the motor 16b for rotation (R). The plasma torch 20a and powder injector 20b may be joined to a modified form of the first carriage designated 28B for plasma spraying the thermal barrier coating powder substantially perpendicular to the airfoil of the blade 14B. This requires the ability to position the plasma torch 20a at a fixed distance from the surface of the blade 14B, with the first carriage 28B traversing the plasma torch 20A toward and away from the blade 14B as it is rotated in each revolution to correspond with the airfoil shape thereof. The first carriage 28B is also effective for traversing the plasma torch 20a vertically or radially along the span axis of the blade 14B for covering the entire surface of the airfoil with the thermal barrier coating 12. The carriage 28B is also effective for pivoting the plasma torch 20a for maintaining a normal orientation relative to the surface of the blade 14B.

In FIG. 6, the preheater 26 is suitably positioned ahead of the plasma torch 20a and is suitably mounted in the second carriage designated 30B configured for effecting similar motion of the preheater 26 like that of the spray torch 20a illustrated therein.

Figure 7:
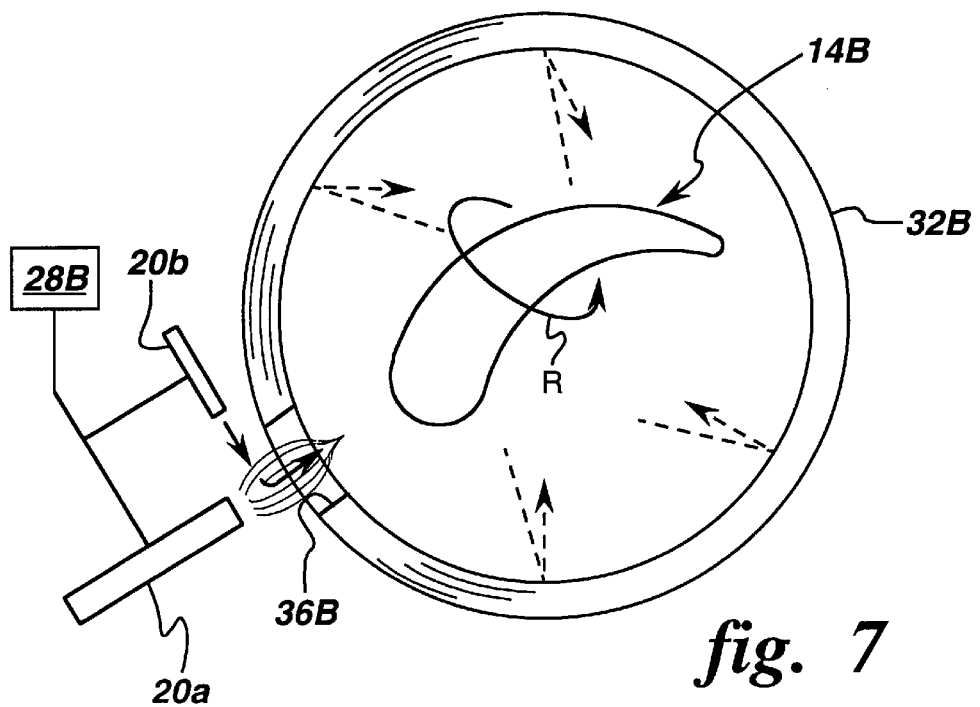
FIG. 7 is a top view of an apparatus in accordance with another embodiment of the present invention including an annular radiation shield surrounding a gas turbine engine rotor blade for providing preheating during plasma spray coating of the thermal barrier coating thereon.

FIG. 7 is yet another embodiment of the invention similar to the FIG. 6 embodiment, except that the preheater 26 is not used, but instead a cylindrical form of the radiation shield, designated 32B is used instead. The thermal radiation shield 32B is positioned around the rotating blade 14B and includes a suitable access slot 36B through which the thermal barrier coating 12 is spray deposited atop the outer surface of the blade 14B. The radiation shield 32B may be similar in construction to the shield 32 illustrated in FIG. 5, including a plurality of spaced apart metal sheets having insulating voids therebetween. The radiation shield 32B is concave inwardly toward the blade 14B and reflects radiant heat back to the blade 14B during operation. In this regard, the FIG. 7 embodiment of the invention is similar to the FIG. 4 embodiment for maintaining suitable preheating or temperature retention of the deposited surface ribbon 12b at the spray site 22 for ensuring local remelting thereof for promoting columnar grain growth.

In yet another embodiment, the workpiece or component may be a relatively large flat plate not suitable for rotation. Accordingly, sweeping of the spray site may be accomplished by conventionally traversing the spray site across the component in fast, generally straight strokes to deposit the overlapping ribbons. Preheating of the spray site may be similarly effected for enjoying the benefits of the invention without rotation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed:

1. A method for forming a thermal barrier coating on a metal component, comprising:

spraying a molten thermal barrier coating powder at a spray site on said component;

sweeping said spray site across said component over a plurality of strokes to coat thereon a plurality of overlapping solidified coating ribbons of the same thermal barrier coating material, said ribbons corresponding with said plurality of strokes, including a surface ribbon which is sequentially deposited over previously-applied ribbons, thereby forming sublayer ribbons therebelow; and preheating said previously-applied surface ribbon ahead of said spray site and prior to the sequential deposition of another surface ribbon, so that said spraying remelts said previously-applied surface ribbon at said spray site for sequentially welding said sequentially deposited surface ribbons to said sublayer ribbons.

2. A method according to claim 1 further comprising:

rotating said component over a plurality of revolutions; and spraying said molten powder at said spray site on said rotating component to coat thereon said plurality of overlapping solidified coating ribbons corresponding with said plurality of revolutions.

3. A method according to claim 2 further comprising:

traversing said spray site in a first pass direction between axially opposite ends of said component as said component rotates to form across said component a continuous first pass layer, including a plurality of said overlapping sublayer ribbons;

traversing said spray site in an opposite second pass direction between said component opposite ends to form across said component a continuous second pass layer, including a plurality of said overlapping sublayer ribbons, atop said first pass layer; and preheating said surface ribbon of said first pass layer ahead of said spray site so that said spraying remelts said surface ribbon at said spray site for welding said second pass layer to said first pass layer.

4. A method according to claim 3 wherein said surface ribbon preheating is independent of heat from said spraying, and applies additional heat to said surface ribbon ahead of said spray site.

5. A method according to claim 3 wherein said surface ribbon preheating is dependent on heat from said spraying, and comprises shielding thermal radiation from said ribbons coated on said component to decrease radiation cooling thereof between said revolutions.

6. A method according to claim 3 further comprising:

rotating a plurality of said components along an annular path, circumferentially spaced apart from each other;

sequentially spraying said ribbons atop said components in turn; and cooling said components from below.

7. A method according to claim 6 wherein:

said spraying is plasma spraying for spraying said molten powder at said spray site;

said coating comprises zirconia; and said preheating is effective for promoting directionally solidified columnar grain growth from said sublayer ribbons into said surface ribbon.

* * * * *